(12) United States Patent
Suga

(10) Patent No.: US 7,604,475 B2
(45) Date of Patent: Oct. 20, 2009

(54) MOLD APPARATUS FOR INJECTION MOLDING

(75) Inventor: Masao Suga, Kanagawa (JP)

(73) Assignee: Kanagawaseiki Co., Ltd., Kanagawa (JP)

( * ) Notice: Subject to any disclaimer, the term of this patent is extended or adjusted under 35 U.S.C. 154(b) by 386 days.

(21) Appl. No.: 11/638,231

(22) Filed: Dec. 13, 2006

(65) Prior Publication Data

US 2007/0141193 A1    Jun. 21, 2007

(30) Foreign Application Priority Data

Dec. 19, 2005    (JP)    ............... 2005-365046

(51) Int. Cl.
*B29C 45/43*    (2006.01)

(52) U.S. Cl. ............... 425/437; 425/441; 425/556

(58) Field of Classification Search ............... 425/542, 425/577, 437, DIG. 58, 441, 443, 556; 264/334, 264/335
See application file for complete search history.

(56) References Cited

U.S. PATENT DOCUMENTS

| | | | | |
|---|---|---|---|---|
| 3,373,460 A | * | 3/1968 | Ladney, Jr | 425/416 |
| 4,570,897 A | * | 2/1986 | Von Holdt | 249/144 |
| 4,632,357 A | * | 12/1986 | Von Holdt | 249/58 |
| 4,653,997 A | * | 3/1987 | Sheffield et al. | 425/556 |
| 4,660,801 A | * | 4/1987 | Schad | 249/66.1 |
| 5,824,256 A | * | 10/1998 | Ballester | 264/318 |
| 6,177,041 B1 | * | 1/2001 | Bietzer | 264/318 |
| 6,238,202 B1 | * | 5/2001 | Joseph | 425/556 |
| 6,241,931 B1 | * | 6/2001 | Ciccone et al. | 264/318 |
| 6,390,800 B1 | * | 5/2002 | Brown et al. | 425/436 R |
| 6,604,934 B2 | * | 8/2003 | Ciccone et al. | 425/556 |
| 6,736,628 B1 | * | 5/2004 | Zuffa | 425/437 |
| 2005/0266115 A1 | * | 12/2005 | Ciccone | 425/443 |

FOREIGN PATENT DOCUMENTS

| | | |
|---|---|---|
| JP | 09-314608 | 12/1997 |
| JP | 2002-178354 | 6/2002 |
| JP | 2003-117967 | 4/2003 |
| JP | 2003-145594 | 5/2003 |
| JP | 2003-320563 | 11/2003 |
| JP | 2004-017468 | 1/2004 |
| JP | 2004-025602 | 1/2004 |
| JP | 2004-066699 | 3/2004 |
| JP | 2005-238603 | 9/2005 |

* cited by examiner

*Primary Examiner*—Yogendra Gupta
*Assistant Examiner*—Emmanuel S Luk
(74) *Attorney, Agent, or Firm*—Scott D. Wofsy; Edwards Angell Palmer & Dodge LLP

(57) ABSTRACT

A mold apparatus for injection molding of the invention comprises: a fixed bush that is sliding fitted to a fixed side template formed with a cavity, via an inclined surface, so as to be movable with respect to each other in mold opening and clamping directions; and a movable bush that is sliding fitted to a movable mold stripper via an inclined surface, so as to be movable with respect to each other in mold opening and clamping directions. A plurality of air blowing circuits are formed in the fixed bush and the movable bush, and at the time of mold opening, a small gap is formed between the inclined surfaces, and air (warm air) is blown from the small gap towards an extension portion of a molded product so as to give mold release. High quality injection molded products can be molded without using any hazardous mold release agents.

2 Claims, 12 Drawing Sheets

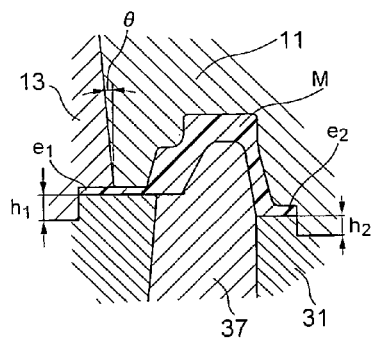
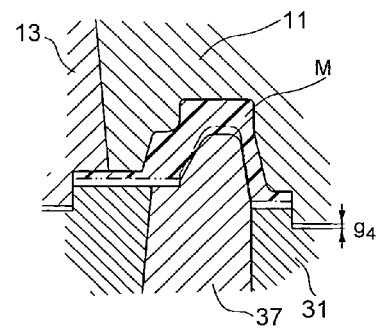
FIG. 7A  FIG. 7B
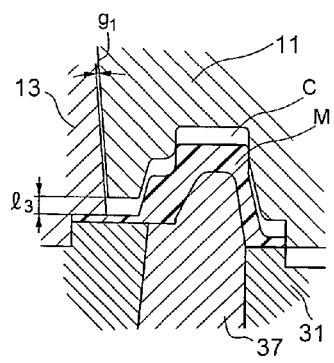
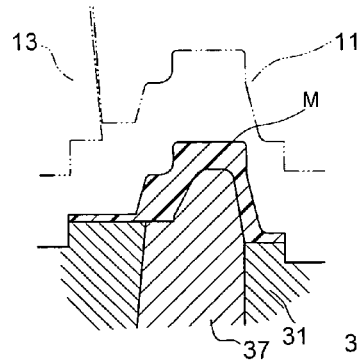
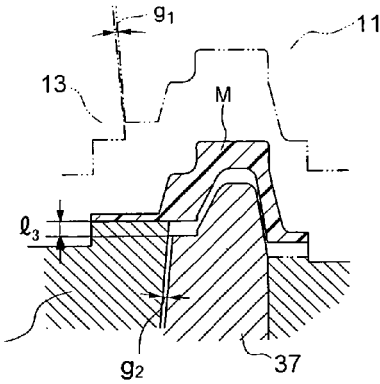
FIG. 7C  FIG. 7D  FIG. 7E

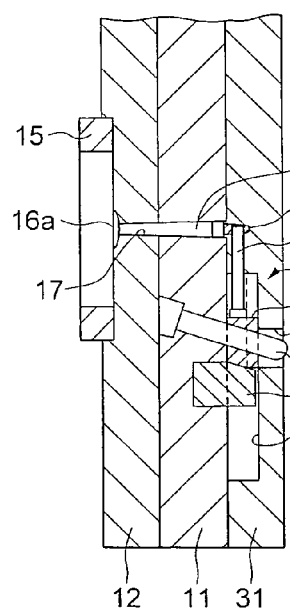 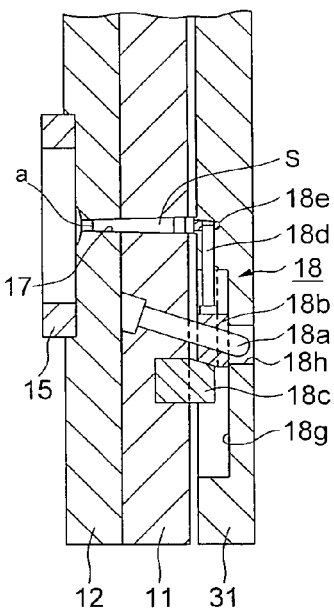 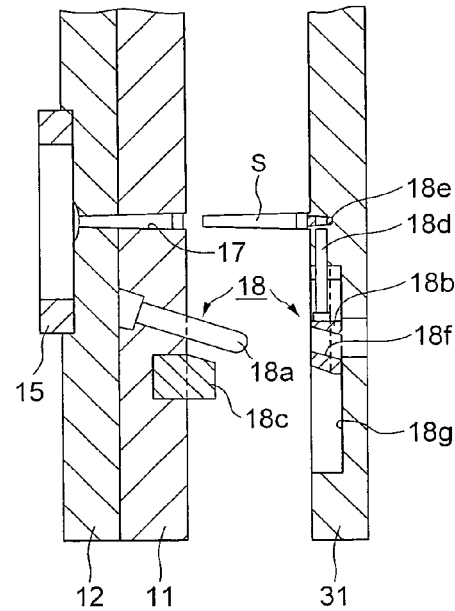
FIG. 8A　　FIG. 8B　　FIG. 8C

100: Hydraulic Power Shovel

101: Crawler Track Shoe
102: Adjust Cylinder
103: Counter Weight
104: Center Swivel
105: Boom Cylinder
106: Hinge Pin
107: Arm Cylinder
108: Hinge Pin
109: Packet Cylinder
110: Hinge Pin
111: Hinge Pin
112: Claw

PRIOR ART

MOLD APPARATUS FOR INJECTION MOLDING

CROSS-REFERENCE TO RELATED APPLICATIONS

This application claims benefit of priority to Japanese Patent Application No. 2005-365046 filed Dec. 19, 2005, now Japanese Patent No. 4,141,471 granted Jun. 20, 2008.

BACKGROUND OF THE INVENTION

1. Field of the Invention

The present invention relates to a mold apparatus used for injection molding of molded products such as an annular packing, which is superior in pressure tightness, heat resistance, sealing characteristics, abrasion resistance, and the like, which is used in cylinders for arms, booms, adjustment, and buckets on a hydraulic power shovel and other general agricultural implements and machinery (refer to FIG. 10).

2. Background Art

In injection molded products such as annular packings made by conventional injection molding, there is a problem in that since they are molded from thermoplastic elastomer polyester (abbreviation; TPE), which is superior in heat resistance, chemical resistance, abrasion resistance and adhesive strength, the molded product is captured each time on the side of the fixed side mold (cavity) when the mold is opened, so that it cannot be completely released from the mold.

That is to say, in the conventional injection molding mold apparatus, as shown in FIGS. 11A and 11B in the mold open condition, the injection mold comprises a fixed mold member 10 and a movable mold member 30. The fixed mold member 10 shown in FIG. 11A comprises a fixed side mounting plate 12 that is fixed to four tie bars 8 (refer to FIG. 1B) by four guide pins and hooks (not shown in the figure), and a fixed side template 11 abutted against this. Moreover, on the fixed side mounting plate 12, a sprue bush 16 which aligns a nozzle (injection port) of an injection head 2 and introduces molten resin into a cavity C, is attached through a locating ring 15 for locating the mounting on the mold.

On the other hand, the movable mold member 30, as shown at the bottom of FIG. 11B, comprises: a movable mounting plate 35 which is guided by four guide pins (not shown in the figure) and moved horizontally on a floor by a drive unit (not shown in the figure), to open and close a mold member; a front pushing out plate 33 and a back pushing out plate 34 which are layer stacked on the movable mounting plate 35; a movable bush 37 that forms a concave portion of a molded product M; and a movable mold stripper 31 into which the movable bush is fitted. During injection molding the molded product M is connected to the sprue portion S by a runner R.

However, for injection molding of this kind of molded product, after injection, the mold is opened and mold release is performed. Then the movable mold stripper 31 is operated to push out the molded product, and lastly the molded product is ejected using an ejector. However, as mentioned above, since the molded product M is captured and held on the fixed side mold (cavity) member 10 side at every mold opening, hazardous mold release agents are often used, and as shown in FIG. 12A, an extension portion $\underline{e}$ which is unnecessary for the final product, is formed on the annular molded product M. Furthermore, an undercut portion $\underline{u}$ with a depth $\underline{d}$ of approximately 1.0 mm for preventing mold capture, is provided at two places for example, all around the annular molded product M, to prevent the molded product M from being captured on the side of the fixed side mold 10. That is to say, so that the molded product M remains on the movable bush 37 side at the time of mold release.

However, even if these countermeasures are taken, the situation where a molded product is still captured on the fixed (cavity) side at the time of mold release often occurs. That is to say, as described above, TPE (abbreviation) which is superior in adhesive strength, is used as the material for this kind of injection molded products. However, since for the conventional injection molding conditions, the tolerance is extremely narrow, there is the problem in that even if the molding conditions are the same for different lots (date of manufacture) for the molding material, injection molded products having the same quality and the like cannot be obtained.

Therefore, in the prior art, in the injection molding apparatus for use, at first a test piece is molded, and after molding this is immediately subjected to a predetermined mechanical process, and the processed product is annealed (for example, simply for about one hour at 120° C. approximately), and after pre-confirming faulty portions, normal molded products are produced. However, by this kind of prior art method, since molding is performed for each lot of the molding material as mentioned above, then at this point in time already 20% to 30% of defective products have occurred. Furthermore, by mechanical processing the extension portion $\underline{e}$ which is unnecessary for the final product, to separate this from the molded product at the chain line part of FIG. 12A, gives a final product such as shown in FIG. 12B. Here, for this kind of packing, a situation where traces of push out pins, parting lines and the like remain on the product surface is not permitted considering product tolerances.

Here, for molding products that have passed inspection and have been annealed (for example 12 hours at approximately 125° C.), deformation due to changes in the molecular weight of the molding material occur, so that similarly another 20% to 30% of defective products occurs.

However, for this kind of conventional injection molded products, even if the countermeasure of providing the above mentioned undercut portion is taken, it often happens that a molded product is captured on the cavity side. Therefore hazardous mold release agents are sprayed on the mold frequently (for example, at each mold opening).

Here, as this kind of mold release agent, for example, SuperFlip 7 (brand name) from Toyo Chemical Co., Ltd. that consists primarily of dimethyl ether, has been used. However not only it is expensive, but also it is hazardous, and there are problems for work safety, the environment, and the like.

That is to say, with this kind of mold release agent, because the constituent contents comprise isohexane, isopropylalcohol, silicon fluoride, dimethyl ether and the like, there is at danger such as the possibility of damage or explosion if it is left under high temperature and high humidity conditions, or thrown into water, without gas venting. Moreover since it is flammable, adequate care must be taken with fire during use. Furthermore, it is harmful if drunk by mistake or if it explodes. Moreover, highly concentrated vapor has an anesthetic action, and if inhaled, symptoms such as headache, dizziness, and vomiting appear, and in some cases it gives unconsciousness or difficulty of breathing. Moreover, it is hazardous in that it irritates the skin, eyes, mucous membrane and the like. Furthermore, the substance for forming this mold release agent can have an affect on animals, plants, birds, insects, aquatic animals, microorganisms and the like, and the substance has an influence on the environment, in that it is harmful to the natural surroundings, and water quality systems, and can have an adverse affect.

Moreover, by using this kind of hazardous mold release agent, defects such as pockmarks and peeling occur on the surface of the molded product. Furthermore, as mentioned above, because an extra undercut portion is provided on the molded product, then after injection molding, when pushing out and releasing the molded product from the mold with the movable mold stripper 31, as shown in FIG. 12C, FIG. 12D and FIG. 12E, additional defects such as turn up and deformation, easily occur on the extension portion u. Furthermore, because the sprue part S shown in FIG. 11B is similarly captured on the fixed mold side at the time of mold opening, an undercut portion u' as shown in FIG. 11B, is provided on the sprue part S. Additionally, because the molding conditions for the conventional injection molding are extremely severe, the molded product can be deformed with only a change in the molecular weight of the molding resin. Therefore, in order to equalize the polymer structure in all molded products, an annealing process is performed over a long time at a high temperature (for example, above 100° C.).

Therefore the proportion defective of the injection molded products such as annular packings, using the conventional mold for injection molding has been extremely high at 25 to 30%.

(refer to Japanese Unexamined Patent Publication No. Hei 09-314608)

Problems that the Invention is to Solve

Therefore, the present invention takes into consideration the above difficulties of the conventional mold apparatus for injection molding, with an object of providing a mold apparatus for injection molding that is able to mold high quality injection molded products with higher productivity and yield, without using hazardous mold release agents, by blowing air (warm air) from fine clearances formed inside a mold at the time of opening the mold, to positions corresponding to several parts around the whole periphery of a molded product, so as to move the molded product from a cavity (fixed) side to a movable side at the time of mold release.

SUMMARY OF INVENTION

The present invention relates to a mold apparatus for injection molding comprising: a fixed bush that is sliding fitted to a fixed side template formed with a cavity, via an inclined surface, so as to be movable with respect to each other in mold opening and clamping directions; and a movable bush that is sliding fitted to a movable mold stripper via an inclined surface, so as to be movable with respect to each other in mold opening and clamping directions, and a plurality of air blowing circuits are formed in the fixed bush and the movable bush, and at the time of mold opening a fine gap is formed between the inclined surfaces, and air (warm air) is blown from the gap towards a molded product so as to give complete mold release without using a hazardous mold release agent.

According to the mold apparatus for injection molding of the present invention, at the time of mold release of the molded product from the mold, this can be 100% released by only blowing air (warm air), without using an expensive and hazardous mold release agent. Therefore, the molded product is moved to the movable side without the molded product being captured to the fixed (cavity) side at the time of mold opening, and the incidence rate of defective product is improved to be nearly zero, by using together a vertical hole exhaust method and compression molding according to other inventions of the present inventors. Moreover, high quality molded products can be obtained that have no roughness such as pockmarks on the surface of the molded product. Furthermore, there is no deformation of the molded products during the anneal process after molding, and reusing portions other than the final product (for example the sprue portion) becomes possible.

BRIEF DESCRIPTION OF THE DRAWINGS

FIG. 1 shows an injection molding apparatus equipped with an injection molding mold apparatus of the present invention; wherein

FIG. 2 shows an injection molded product (for example, an annular packing for a hydraulic power shovel as shown in FIG. 10 or other agricultural machinery) molded by the injection molding mold apparatus of the present invention; wherein

FIG. 7 is a part cross-section view of a cavity portion, for describing the movement of the injection molding mold apparatus of the present invention; wherein FIG. 7A shows a molding condition with the mold clamped for molding, FIG. 7B shows a condition where a molded product is further compressed after molding, FIG. 7C shows a mold opening condition for air blowing, FIG. 7D shows a condition where the mold is completely open, and FIG. 7E shows an air blowing condition for pushing the molded product out from the mold.

FIG. 8 shows a condition where a slide core pin as shown in FIG. 5B that is mounted on an injection molding mold apparatus of the present invention, cuts a sprue portion on an injection molded product as a result of the mold opening; wherein FIG. 8A shows a mold clamping and molding condition, FIG. 8B shows condition where a sprue portion tip end is cut by opening the mold by for example 5 mm, and FIG. 8C shows a condition where a slide core pin is completely pulled out from a sprue drop in portion, and an inclined pin is completely pulled out from a movable mold stripper, by opening the mold further.

FIG. 11 shows a half part cross-section of a condition where a movable side mold of a conventional injection molding mold apparatus is moved (retracted) after injection to open the mold, wherein

FIG. 12 shows an injection molded product (for example, an annular packing for a hydraulic power shovel or agricultural machinery) made by a conventional injection molding mold apparatus; wherein FIG. 12B shows a part cross-section of a product that has been mechanical processed to remove unnecessary portions, while

DETAILED DESCRIPTION OF THE PREFERRED EMBODIMENTS

Figure 1A:
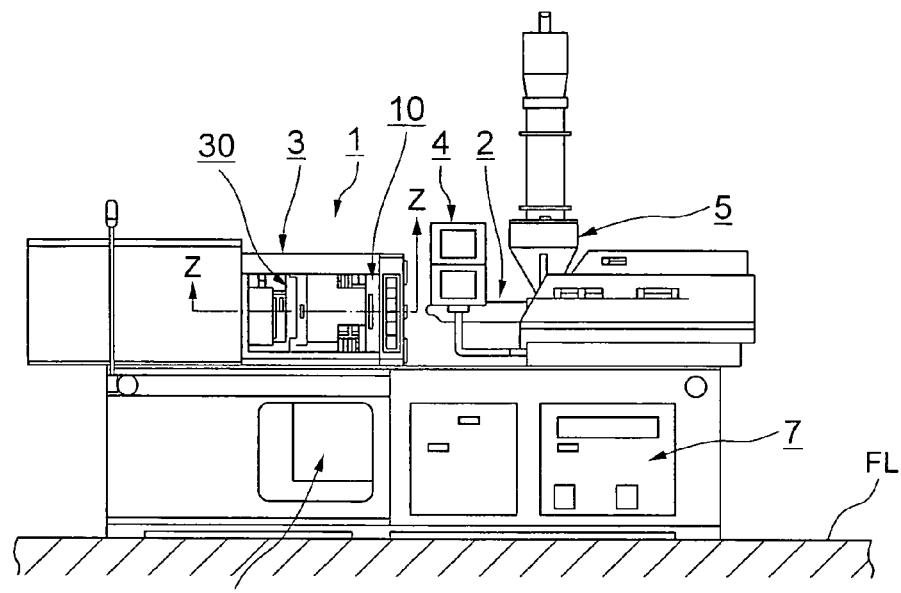
FIG. 1A shows a front view.
Figure 1B:
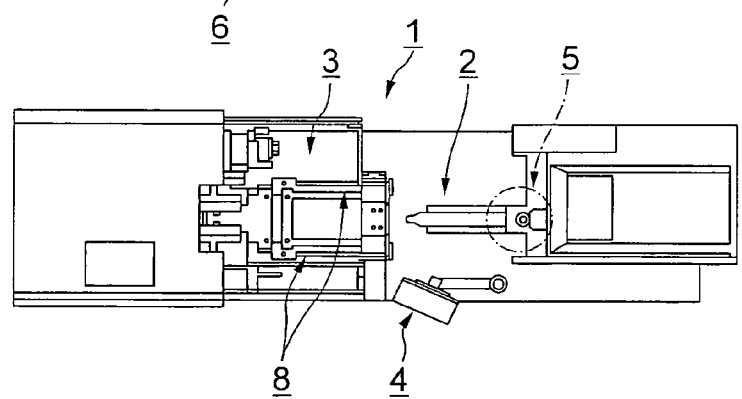
FIG. 1B shows a plan view.
Figure 2A:
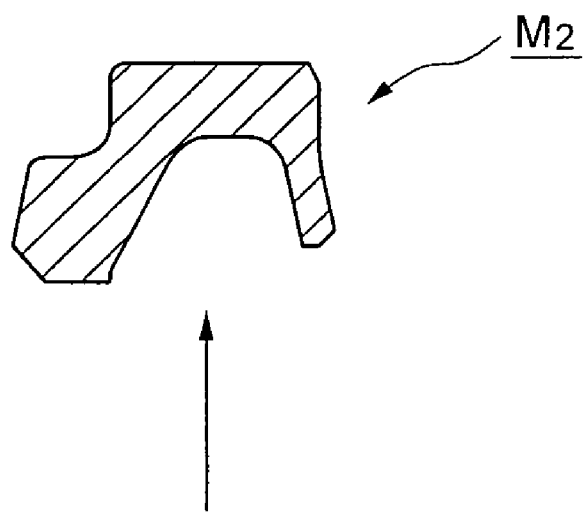
FIG. 2A shows a partial cross-section of a product (annular packing) after mechanical processing.
Figure 2B:
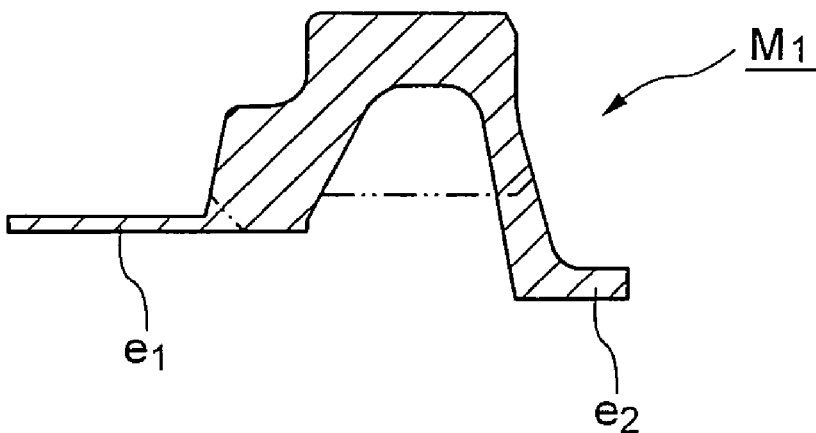
FIG. 2B shows a partial cross-section of an injection molded product.

First, FIG. 1A and FIG. 1B of the appended drawings show a mold apparatus for injection molding of the present invention which is mounted for molding injection molded products $M_1$ and $M_2$ (for example an annular packing) shown in FIG. 2A and FIG. 2B.

The injection molding apparatus 1, as shown in FIG. 1A and FIG. 1B, is installed on a floor FL via rubber vibration isolators or the like, and comprises: an injection cylinder head 2 which is moved horizontally with respect to the floor FL on a main body of the injection molding apparatus 1, so that an injection port is connected to a sprue push (described below) on a mold apparatus for injection molding 3, to introduce molten molding resin such as thermoplastic elastomer polyester (abbreviation; TPE) to inside a mold; an operation display unit 4 for monitoring the injection molding operation; a hopper 5 for supplying particulate molding resin into the injection head 2; a chute 6 for storing injection molded products released and taken out from an injection molding mold; a control panel 7 for housing control units for the whole injection molding apparatus 1; and four tie bars 8 for mounting the mold apparatus for injection molding 3 onto the injection molding apparatus 1 by hooks, and performs prescribed injection molding processes.

The molded product $M_1$ (for example, an annular packing) which is molded by the injection molding mold apparatus of the present invention, is provided with annular tabular extension portions $\underline{e}_1$ and $\underline{e}_2$, as shown with solid lines in FIG. 2B, to facilitate mold release of the molded product by air blowing and stripping as described hereinafter. After mold release, the tabular extension portions $\underline{e}_1$ and $\underline{e}_2$, are cut at the chain line portions in FIG. 2B to obtain the final molded product $M_2$.

Next is a detailed description of the construction of the mold apparatus for injection molding 3 of the present invention, using FIG. 3 to FIG. 6.

Figure 3:
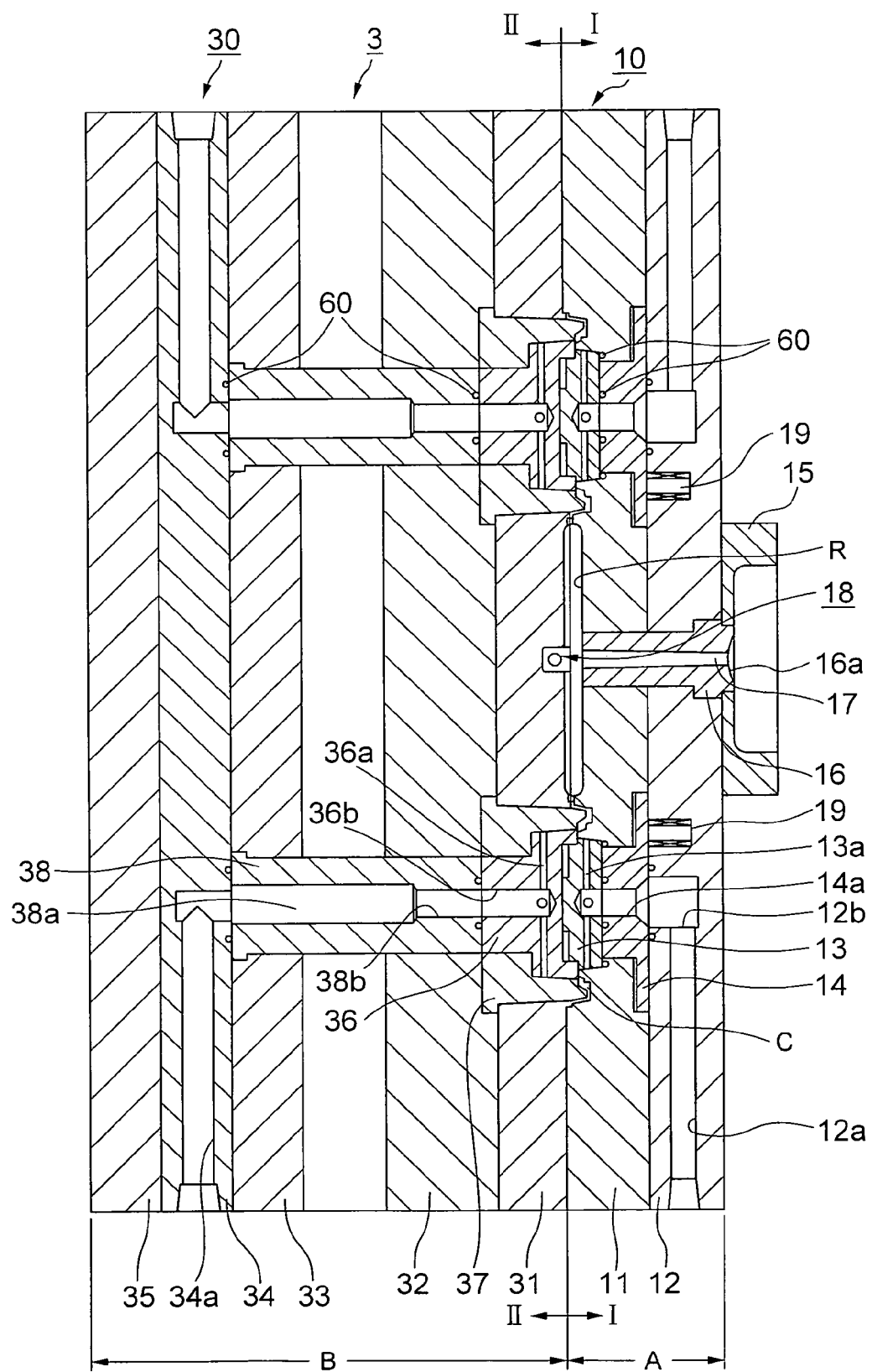
FIG. 3 is a cross-section view on arrows Z-Z in FIG. 1A of the injection molding mold apparatus of the present invention, showing a condition with the injection molding mold clamped and closed.

FIG. 3 shows a mold of the mold apparatus for injection molding 3 of the present invention in a closed and clamped condition. This mold apparatus 3 comprises a fixed side mold member A and a movable side mold member B.

Figure 4:
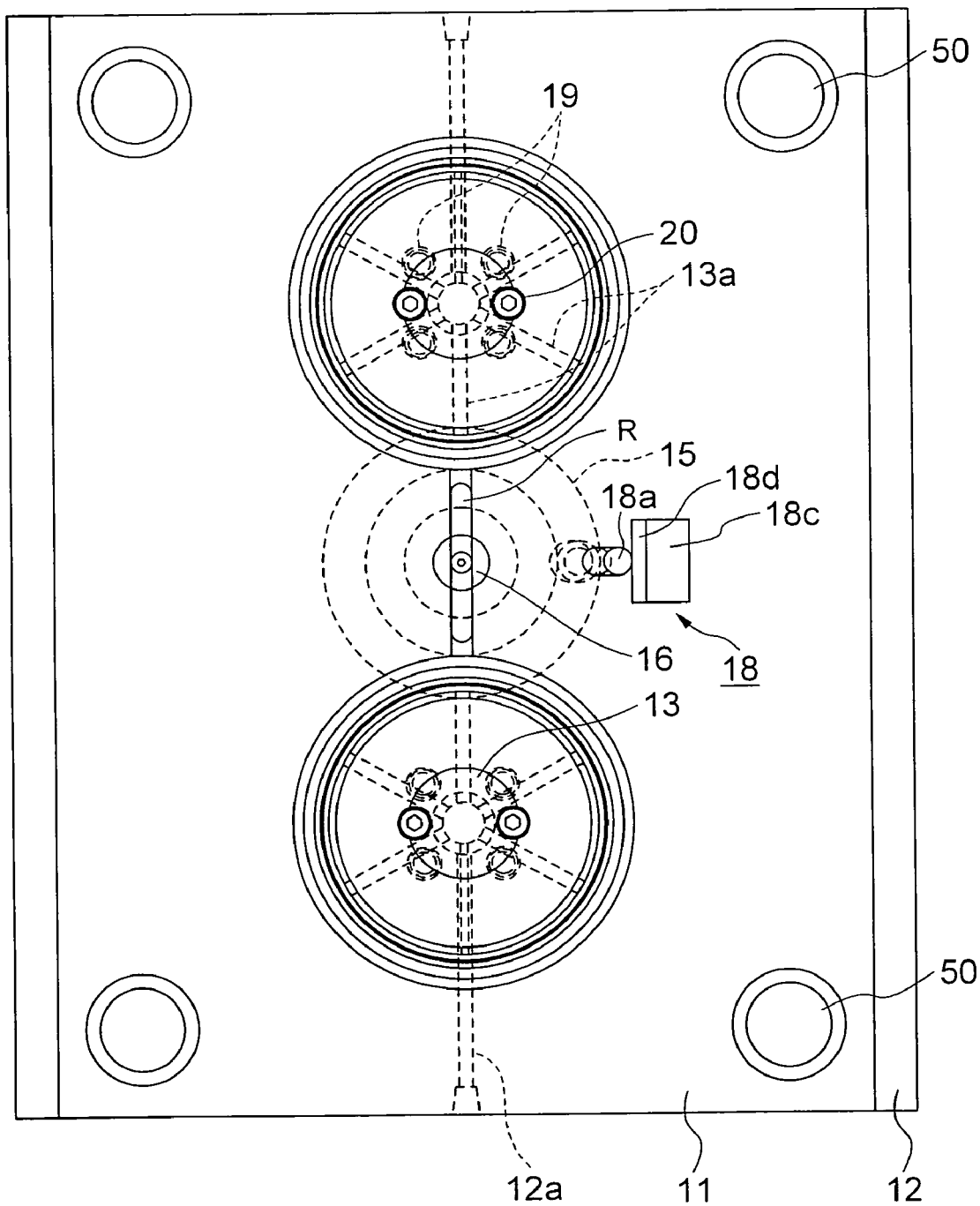
FIG. 4 is a front view on arrows I-I in FIG. 3 of a fixed side mold member of the injection molding mold apparatus of the present invention.

The fixed side mold member A, as shown in FIG. 3 and FIG. 4 comprises; a fixed side mounting plate 12 that is fixed to the four tie bars 8 by four guide pins 50 (refer to FIG. 1A and FIG. 1B) and hooks (not shown in the figure), and a fixed side template 11 abutted against this. Moreover, on the fixed side mounting plate 12, a sprue bush 16 having a sprue 17 and a nozzle guide portion 16a, which aligns a nozzle (injection port) of an injection head 2 (refer to FIG. 1A and FIG. 1B) and introduces molten resin into a cavity C, is attached through a locating ring 15. In the embodiment of the present invention, two cavities C are provided for producing two pieces. However, a plurality of cavities C may be formed to produce multi pieces of three or more.

Furthermore, as shown in FIG. 3, a fixed bushA 13 and a fixed bushB 14 are fitted into the fixed side template 11, and a concave portion constituting one half of the cavity C is engraved in the fixed bushA 13. The fixed bushB 14 and the fixed bushA 13 are made separate for manufacturing convenience, but in use they are combined together by connection bolts 20 shown in FIG. 4.

In the fixed side mounting plate 12, as shown in FIG. 3, a plurality of air blowing circuits (holes) 12a are piercingly provided in the radial direction (parting line direction of the mold), and are communicated fluidwise with the air blowing circuits (holes) 12b provided at positions concentric with the fixed bushB 14 in the fixed side mounting plate 12. To these air blowing circuits (holes) 12b are connected smaller diameter pouch like holes 14a that are provided in the fixed bushB 14, to be communicated fluidwise with for example six air blowing circuits (holes) 13a, that are provided radially around the perimeter (360°) of the fixed bushA 13. Moreover, in the fixed side mounting plate 12 at positions corresponding to the upper face of the fixed bushB 14, are embedded one or a plurality of (for example four) springs 19 (refer to FIG. 4), for urging the fixed bushB 14 in the mold opening direction, and moving the fixed bushB 14 in the mold opening direction, as described below, at the time of mold opening. By this movement, a clearance (fine gap) $g_1$ is formed on the inclined surface (for example 5° taper) between the fixed bushA 13 and the fixed bushB 14, and air (heated compressed air: warm air) is to blow from the air blowing circuit 12a through the clearance $g_1$ towards the extension portion $e_1$ of the molded product $M_1$ as shown in FIG. 2B. In the case where only one spring 19 is used, this is located at the center of the fixed bushB 14, and the air blowing circuit is formed at a position to avoid the spring 19.

Figure 5A:
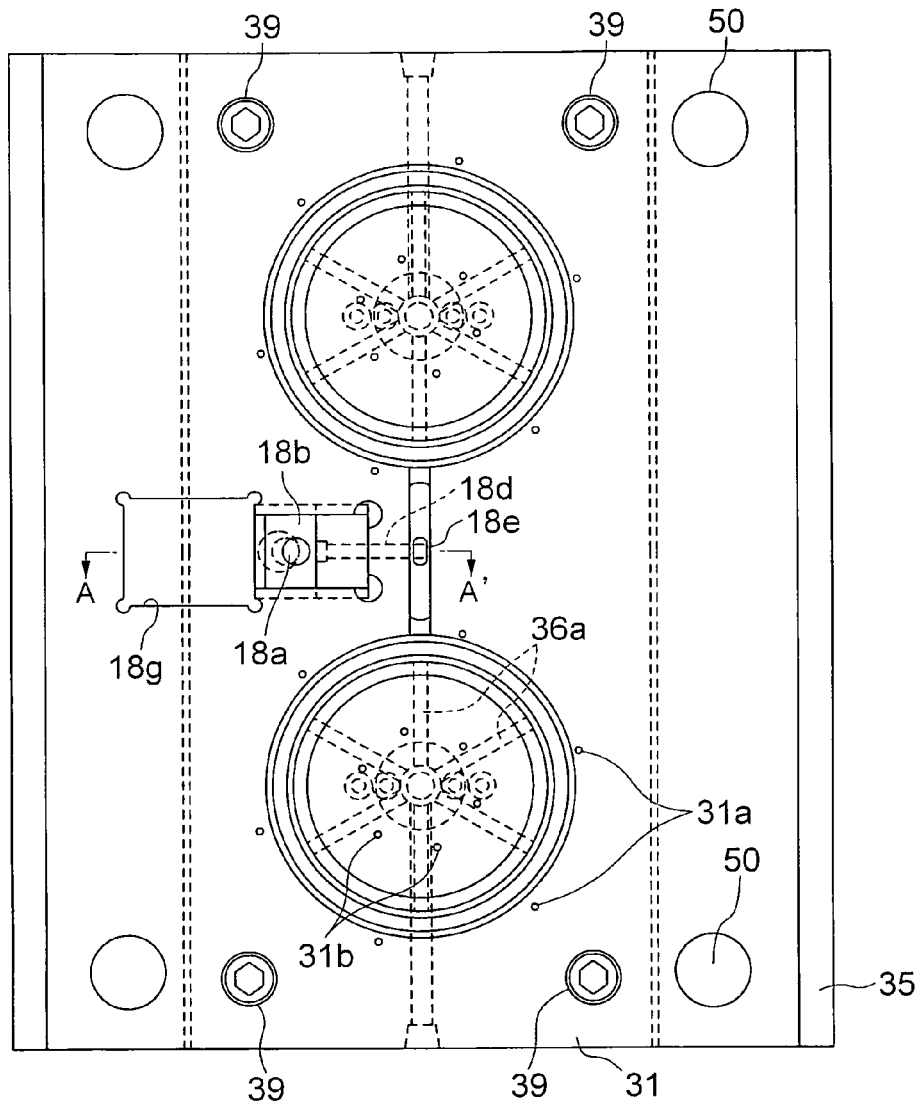
FIG. 5A shows a front view on arrows II-II in FIG. 3 of a movable side mold member of the injection molding mold apparatus of the present invention.
Figure 5B:
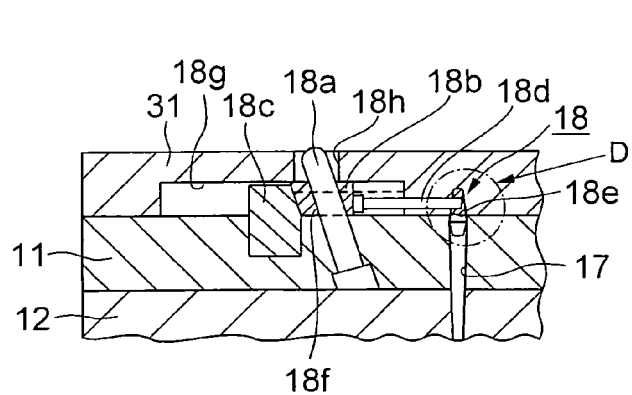
FIG. 5B shows a part enlarged cross-section view on arrows A-A' in FIG. 5A of a slide core pin device.
Figure 5C:
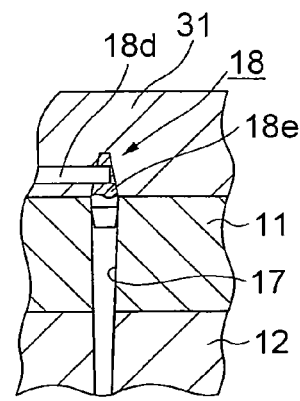
FIG. 5C shows a part enlarged cross-section view on arrow D in FIG. 5B.

On the other hand, the movable side mold member 30, as shown in FIG. 3 and FIG. 5, comprises: a movable side mounting plate 35 which is guided by four guide pins 50 and moved horizontally with respect to the floor FL by a drive unit (not shown in the figure), to open and close the mold member; a rear pushing out plate 34 provided with an air blowing circuit (hole) 34a that extends radially (parting line direction of the mold), a front pushing out plate 33, a backing-plate 32, and a movable mold stripper 31 that is closely-contacted with the backing-plate 32. The rear pushing out plate 34 and the front pushing out plate 33 are combined together by fastening bolts (not shown in the figure).

Figure 6A:
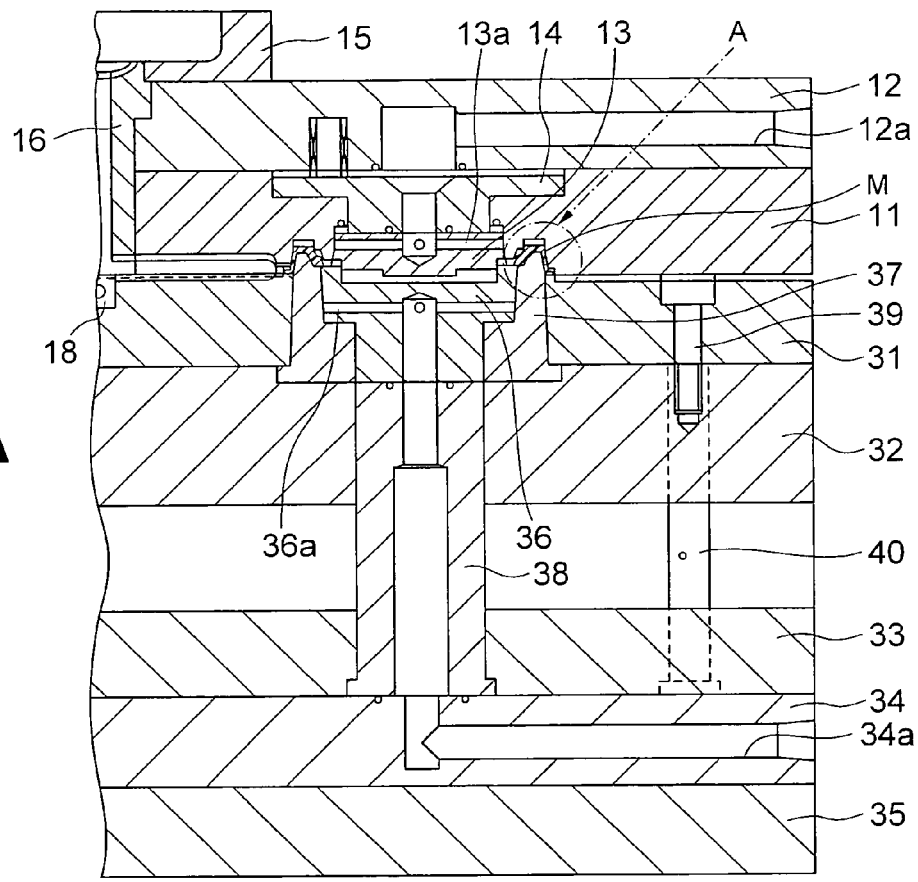
FIG. 6A shows a condition for air blowing from fine clearances, with the injection molding mold apparatus of the present invention shown in FIG. 3 opened.

Here the movable mold stripper 31 and the backing-plate 32 are fastened and combined together by connecting bolts 39 (refer to FIG. 5A), and moved under guidance by return pins 40 (for example four) (refer to FIG. 6A).

Furthermore, as shown in FIG. 3, a movable bushA 37 on which the cavity C is convex provided concentrically with the fixed bushA 13 provided on the fixed mold side, corresponding to the upper half portion (concave portion) of an injection molded product, is fitted into the movable mold stripper 31, and a movable bushB 36 is slidingly provided inside the movable bushA 37 concentrically. Furthermore, a movable bushC 38 is fitted concentrically with the cavity C, between the backing-plate 12 and the front pushing out plate 33, and in the central portion thereof is formed an air blowing circuit (hole) 38a that is communicated fluidwise with the air blowing circuit (hole) 34a formed in the rear pushing out plate 34, and an air blowing circuit (hole) 38*b* that is smaller in diameter and concentric. Furthermore, at the tip end part of the movable bushB 36 which is engaged with the fixed bushA 13 at the time of mold closing, is piercingly provided a plurality of, for example six, air blowing circuits (holes) 36*a* radially extending around the perimeter (360°), and these are fluidwise communicated with the air blowing circuits (holes) 34*a*, 38*a* and 38*b*. As a result, as described below, at the time of mold opening, it is constructed so as to blow air (warm air) from a gap $\underline{g}_1$ formed between the inclined surface (for example 5° taper) of the movable bushB 36 and the movable bushB 36.

Moreover, at joint surfaces of each member constituting the mold apparatus for injection molding of the present invention, O-rings 60 are inserted for air leak prevention. Furthermore, to prevent a later described situation where the sprue portion S is captured by the cavity side at the time of mold opening, a slide core pin device 18, that is adjacent to the runner portion 12 and has a slide core pin for latching with the sprue 17, is provided at the central portion of the movable mold stripper 31.

As shown in FIG. 5A and FIG. 8A, the core pin device 18 comprises: an inclined pin (angular pin) 18*a* that is inclined and implanted in the fixed side template 11 on a transverse center line; a slide core 18*b* having a hole 18*f* into which the slide core pin 18*a* is inserted; a slide core pin 18*d* connect to the slide core 18*b*; and a sprue drop in portion 18*e* that is provided at the tip end portion of the slide core pin 18*d* with a base part connected to a hole of the sprue 17, and a head part fitted into a groove formed inside the movable mold stripper 31, that is made from the same material as the molded product and that has a hole for insertion of the tip end portion of the slide core pin 18*d*; and a stopper 18*c* that is fitted into a groove formed in the fixed side template 11 and that projects to inside a concave portion (groove) 18*g* formed in the movable mold stripper 31, to abut with the slide core 18*b* and stop the sliding movement at a predetermined position. The inclined pin 18*a* is loose fitted at the time of mold clamping, within a hole 18*h* formed in the movable mold stripper 31.

Figure 6B:
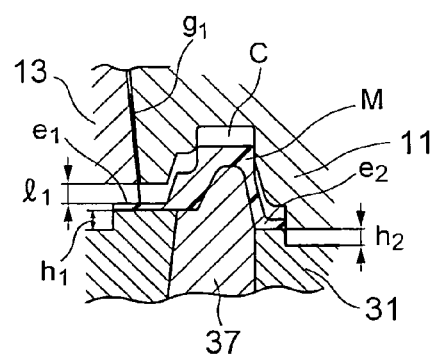
FIG. 6B shows a part enlarged view on arrow A in FIG. 6A.

FIG. 6A shows a half portion of an injection molding mold apparatus of the present invention, and FIG. 6B shows a part enlarged view of the cavity C portion on arrow A in FIG. 6A. In particular, FIG. 6B shows a condition where the mold is opened by a distance $\underline{l}_1$, for example 1.5 mm, to form a fine gap (clearance) $\underline{g}_1$ between the fixed bushA 13 and the fixed side template 11, and the molded product M is detached from the fixed side mold 10 by blowing air (warm air) from the gap $\underline{g}_1$.

Next, based on FIG. 7, is a description of the operation of the injection molding mold apparatus of the present invention (in particular the relation between mold opening and air (warm air) blowing).

Here FIG. 7 is a part cross-section view of a cavity portion, for describing the movement of the injection molding mold apparatus of the present invention (corresponding to FIG. 6B); wherein FIG. 7A shows a condition with the mold clamped for molding, FIG. 7B shows a condition where the mold is again temporarily opened after molding and the molded product is compressed (refer to the chain line portion), FIG. 7C shows a mold opening condition for air blowing, FIG. 7D shows a condition where the mold is completely open, and FIG. 7E shows an air blowing condition for pushing the molded product out from a mold.

First, as demonstrated in the part enlarged view for at the time of mold clamping in FIG. 7A, a fixed side mold is constituted by the fixed side template 11 for forming the concave cavity C, and the fixed bushA 13 having an inclined surface of angle θ (for example 5° taper) which is slidingly engaged therewith. On the other hand, a movable mold is constituted by the convex movable bushA 37 and the movable mold stripper 31 via fitting portions (steps) of $\underline{h}_1$ (for example 2 mm) and $\underline{h}_2$ (for example 1.5 mm). The molded product M is molded by injecting molding resin (for example thermoplastic elastomer polyester) into the cavity C formed between the two molds.

As shown in FIG. 6B and FIG. 7A, these fitting portions $\underline{h}_1$ and $\underline{h}_2$ form so-called parting lines that correspond to the bottom surfaces of the extension portions $\underline{e}_1$ and $\underline{e}_2$ of the molded product M. That is to say, the steps $\underline{h}_1$ (for example 2 mm) and $\underline{h}_2$ (for example 1.5 mm) from the top surface of the movable mold stripper 31 are formed to give fitting portions. By engaging the fixed bushA 13 on the step $\underline{h}_1$ and engaging the convex portion of the fixed side template 11 on the step $\underline{h}_2$ during mold closing as shown in FIG. 7A, leaking of blown air is prevented. That is to say, the above mentioned leaking of blown air at the time of mold opening is prevented by the fitting portions $\underline{h}_1$ and $\underline{h}_2$.

Next, as shown in FIG. 7B, by adjusting the injection and mold clamping pressure, or a toggle mechanism, then as shown by the chain line, the movable side mold is moved with respect to the molded product M, to open the mold by a predetermined amount $\underline{g}_4$ (for example 0.1 to 0.2 mm) ($\underline{g}_4$ is set by a toggle mechanism in the case of an electric injection molding machine, or is set by injection pressure in the case of a hydraulic injection molding machine). Then the mold is closed and tightened and compressing is performed to densify the internal structure of the molded product, to thereby improve the quality of a molded product.

Then, as shown in FIG. 7C, the movable side mold 30 is moved (retracted) to perform mold opening. By this mold opening, the fixed bushA 11 is urged by one or a plurality of the springs 19 shown in FIG. 3 and moves, and a fine clearance $\underline{g}_1$ is formed between the taper (slope) (θ: for example 5° approximately) slide fitting surfaces of the fixed bushA 11 and the fixed side template 11 for blowing air. From an examination by the present inventors, the relation between the mold opening amount $\underline{l}_3$ shown in FIG. 7C and the clearance (gap) $\underline{g}_1$ for air blowing is described below.

For example, when the mold opening amount $\underline{l}_3$ is 1.5 mm, $\underline{g}_1$ is 0.13 mm (maximum), when $\underline{l}_3$ is 1.0 mm, $\underline{g}_1$ is 0.066 mm, when $\underline{l}_3$ is 0.5 mm, $\underline{g}_1$ is 0.044 mm, and when $\underline{l}_3$ is 0.1 mm, $\underline{g}_1$ is 0.009 (minimum). Here, if $\underline{g}_1$ is 0.13 mm or more, molten resin will flow into the gap $\underline{g}_1$. If $\underline{g}_1$ is 0.009 mm or less, sufficient air blowing cannot be performed from the gap $\underline{g}_1$ Generally, the less of the clearance ($\underline{g}_1$), the stronger the air force, while the bigger the clearance, the weaker the air force due to air dispersion.

Due to the air blowing from the clearance $\underline{g}_1$ which is produced simultaneous with the mold opening, the extension part $\underline{e}_1$ of the molded product M is pushed and moved to the movable side to prevent it being captured on the fixed (cavity) side.

Moreover, as shown in FIG. 7D, when the fixed side mold (the fixed mold 11 and the fixed bushA13) is moved further as shown by the chain line, and the mold is completely opened as shown in FIG. 7E, then by moving the pushing out plates 33 and 34 the same as for the fixed side mold 10, the clearance $\underline{g}_2$ is formed between the taper (inclined) sliding surfaces of the movable bushB 31 and the movable bushA 37.

From an examination by the present inventors, the relation between the mold opening amount $\underline{l}_3$ and the clearance (gap) $\underline{g}_2$ for air blowing is described below.

When the mold opening amount $l_3$ is 1.5 mm, $g_2$ is 0.13 mm, when $l_3$ is 1.0 mm, $g_2$ is 0.066 mm, when $l_3$ is 0.5 mm, $g_1$ is 0.044, and when $l_3$ is 0.1 mm, $g_2$ is 0.009.

By air blowing from the clearance $g_2$, the molded product M is easily pushed out from the movable bushA 37 and mold released, without using expensive and hazardous mold release agent.

Then, after mold release, the extension portions $\underline{e}_1$ and $\underline{e}_2$, and the runner and the like are removed by a predetermined mechanical process. Subsequently an annealing process for approximately 10 hours at a high temperature of 100° C. or more is performed. Therefore, different from heretofore, in the present invention, portions other than the completed product, such as the runners are not annealed, and are able to be reused.

Moreover, in the mold apparatus for injection molding of the present invention, as described above, to prevent the sprue portion S from being captured on the fixed mold at the time of mold opening, the slide core pin device 18, as shown in FIG. 5B, is provided on the fixed side mold 10.

Here, operation of the slide core pin device 18 is described. First, as shown in FIG. 8A, during molding with the mold clamped, the inclined (angular) pin 18a is completely loose fitted in the hole 18h formed in the movable mold stripper 31, and the sprue portion S that is enclosed in the sprue hole 17, is still integrated with the molded product. Moreover, in the hole of the sprue drop in portion 18e that is integrated with the molded product, the slide core pin 18d is still fitted completely. The slide core 18b at this time is abutted with the stopper 18c and movement is blocked. Next, when the mold is opened, for example by 5 mm approximately, then as shown in FIG. 8B, the slide core pin 18d is slightly retracted. However by means of the sprue drop in portion 18e into which the tip end portion of the slide core pin 18d is fitted, sticking of the sprue portion S to the injection nozzle guide portion 16a is prevented. Therefore at the point "a", under the condition with the slide core pin 18d fitted into the sprue portion S, the tip end portion of the sprue portion S is cut and mold released from the fixed side, and moved to the movable side. That is to say it is no longer captured on the fixed side. The slide core 18b at this time is slid within the concave portion 18g while being abutted against the incline face of the stopper 18c. Then, as shown in FIG. 8c, when the mold is opened and the inclined pin 18a is withdrawn from the hole 18h of the movable mold stripper 31, the slide core pin 18d is also withdrawn from the sprue drop in portion 18e, and complete removal of the sprue portion S from the sprue hole 17 is performed.

Furthermore, with the mold apparatus for injection molding of the present invention, gas from the cavity during injection molding is completely removed by employing a vertical hole method according to another invention of the present inventors (Japanese Patent Application No. 2004-05660 (Japanese Unexamined Patent Publication No. 2005-238603)).

Figure 9:
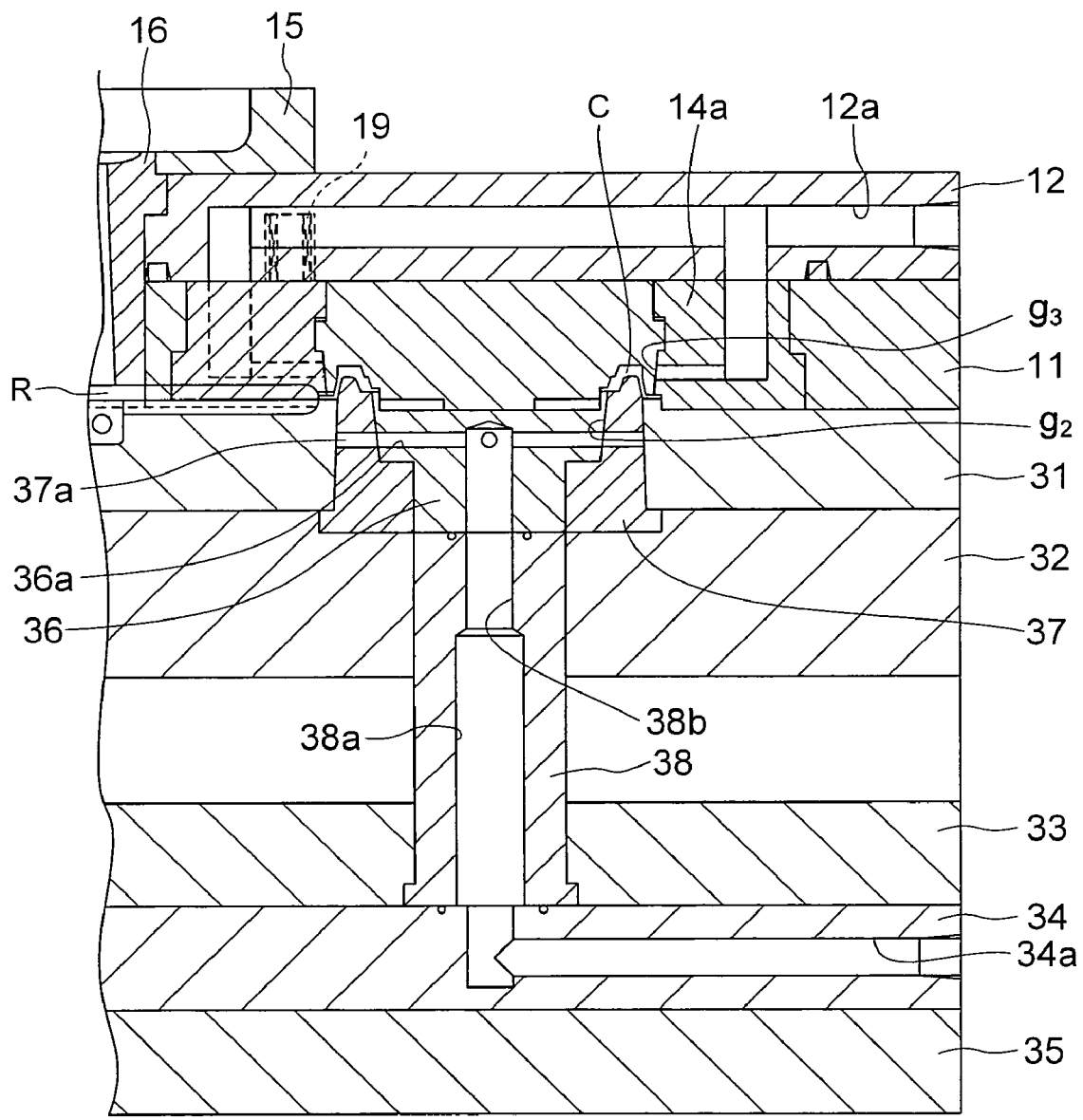
FIG. 9 shows another embodiment of an injection molding mold apparatus of the present invention, showing an embodiment that blows air from outside of a molded product to press out and mold release an extension portion $e_2$ (refer to FIG. 2B) of the product.
Figure 10:
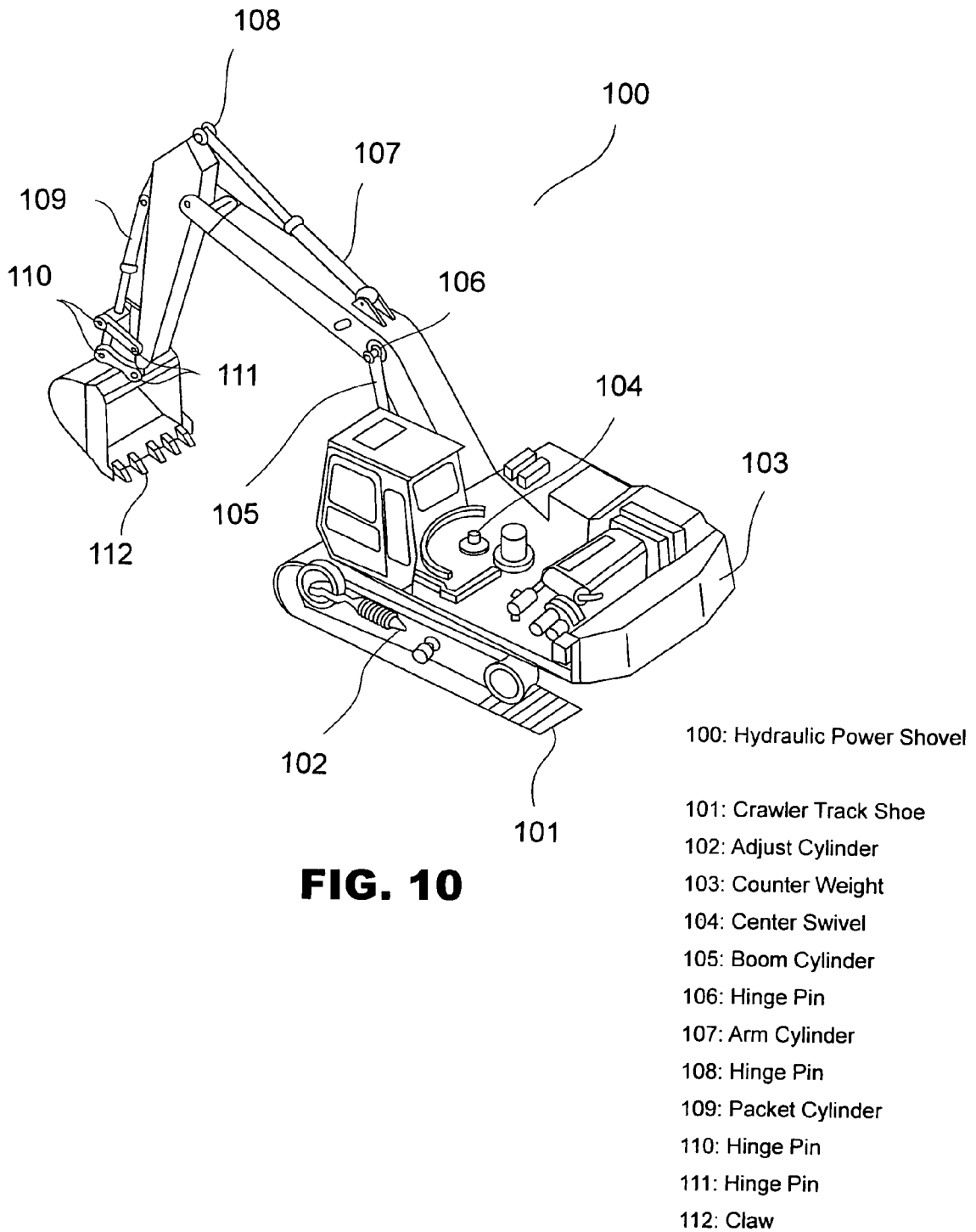
FIG. 10 shows usage sites on a hydraulic power shovel to which is applied an annular packing that is molded by an injection molding mold apparatus of the present invention.
Figure 11A:
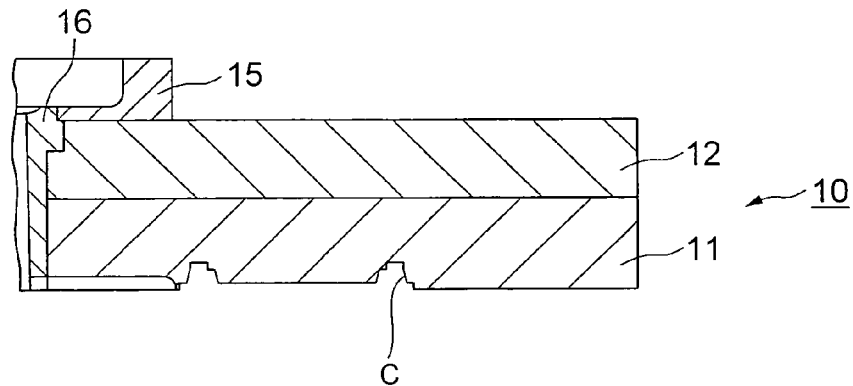
FIG. 11A shows the fixed side mold.
Figure 11B:
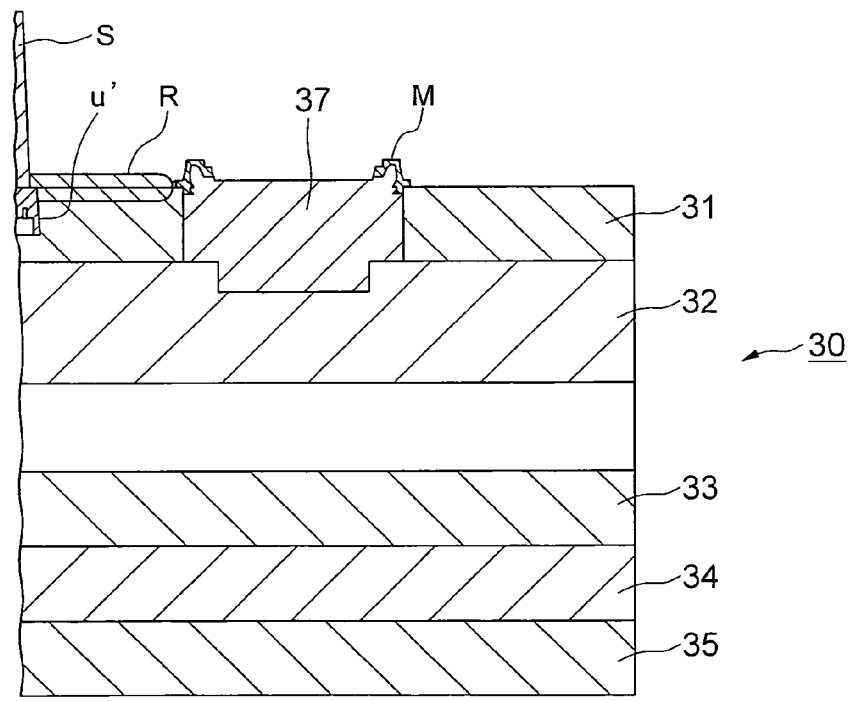
FIG. 11B shows the movable side mold.
Figure 12A:
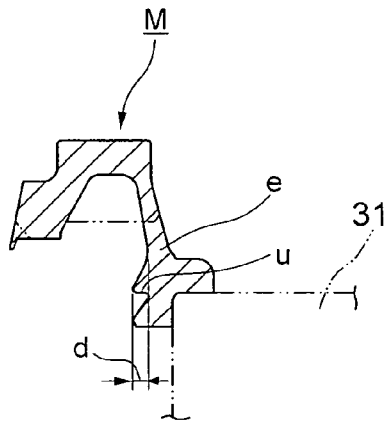
FIG. 12A shows a part cross-section of an injection molded product that is provided with undercut portions at two places around the perimeter of the packing.
Figure 12B:
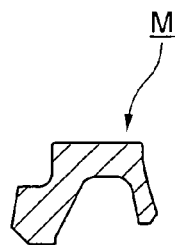
Figure 12D:
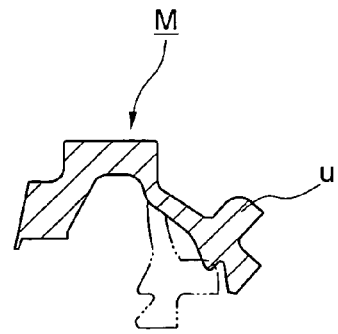
FIG. 12C, FIG. 12D and FIG. 12E show part cross-sections of an injection molded product in a condition where turning up, deformation, or the like has occurred in the undercut portion so that it is further enlarged.
Figure 12C:
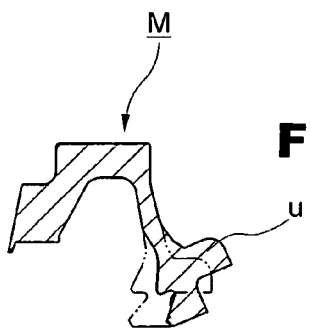
Figure 12E:
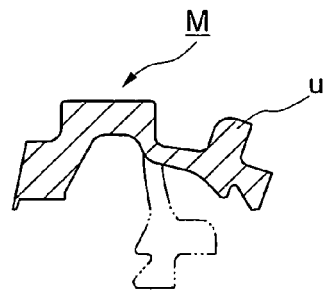

Moreover, as another embodiment of a mold apparatus for injection molding of the present invention, as shown in FIG. 9, a fixed bushB 14a is fitted into a fixed template 11, and a clearance $g_3$ is formed between the fixed template 11 and the fixed bushB 14a at the time of mold opening, and air (warm air) is blown from outside of the molded product onto the extension portion $\underline{e}_2$ (refer to FIG. 2B) of the molded product $M_1$ to give mold release.

The molding apparatus for injection molding of the present invention enables mold release of a molded product without capture to a fixed (cavity) side at the time of mold opening, by only blowing air (warm air), without using any hazardous and expensive mold release agents at all. Therefore, it is widely applicable for molding injection molded products that require precise dimensions, shape, quality, high yield and the like, for example annular products.

What is claimed is:

1. A mold apparatus for injection molding comprising:
a fixed side template formed with a cavity;
a fixed bush that is slidingly fitted to said fixed side template via an inclined surface, so the fixed bush and fixed side template are movable with respect to each other in mold opening and clamping directions;
a moveable stripper that is abutted against said fixed side template;
a movable bush that is slidingly fitted to said stripper via an inclined surface, so the movable bush and the stripper are movable with respect to each other in mold opening and clamping directions; and
a plurality of air blowing circuits formed in said fixed bush and said movable bush, each circuit having air blowing holes radially extending around a perimeter thereof, wherein the fixed side template and the fixed bush are configured and adapted such that at the initial time of mold opening, a first gap is formed between said inclined surface of said fixed side template and said fixed bush, wherein the first gap is configured so that air can be blown from the first gap toward an extension part of a molded product so as to push said extension part, preventing said molded product from being captured in said fixed side cavity, and wherein the moveable stripper and the moveable bush are configured and adapted such that at the time of further mold opening, a second gap is formed between said inclined surfaces of said moveable stripper and said moveable bush, and wherein the second gap is configured and adapted so that air can be blown from the second gap towards a molded product so as to give mold release.

2. A mold apparatus for injection molding according to claim 1, wherein a step of a predetermined height is formed on an outer circumference position of said movable mold stripper corresponding to said extension portion, and protrusions formed on said fixed side template and said fixed bush are respectively engaged with said step to prevent leakage of air during mold clamping.

\* \* \* \* \*